(12) United States Patent
Hsiao et al.

(10) Patent No.: US 9,470,211 B2
(45) Date of Patent: Oct. 18, 2016

(54) POWER CONTROL SYSTEM AND METHOD OF CONTROLLING THE SAME

(71) Applicant: DELTA ELECTRONICS, INC., Taoyuan County (TW)

(72) Inventors: Chih-Hung Hsiao, Taoyuan County (TW); Jo-Fang Wei, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 298 days.

(21) Appl. No.: 14/231,324

(22) Filed: Mar. 31, 2014

(65) Prior Publication Data

US 2015/0214726 A1    Jul. 30, 2015

(30) Foreign Application Priority Data

Jan. 28, 2014  (CN) .......................... 2014 1 0042371

(51) Int. Cl.
| | |
|---|---|
| *F03D 9/00* | (2016.01) |
| *H02P 9/04* | (2006.01) |
| *F03D 7/02* | (2006.01) |
| *H02J 1/00* | (2006.01) |
| *H02P 9/10* | (2006.01) |

(52) U.S. Cl.
CPC ............. *F03D 9/002* (2013.01); *F03D 7/0272* (2013.01); *H02J 1/00* (2013.01); *H02P 9/107* (2013.01); *Y02E 10/723* (2013.01); *Y02E 10/725* (2013.01)

(58) Field of Classification Search
CPC ....... F03D 7/0284; F03D 7/047; H02P 9/102
USPC ....................................... 290/44, 55
See application file for complete search history.

(56) References Cited

U.S. PATENT DOCUMENTS

| | | | | |
|---|---|---|---|---|
| 8,076,789 | B2* | 12/2011 | Miller | ............... F03D 7/048 290/43 |
| 2004/0021323 | A1* | 2/2004 | Lee | ............... B60K 6/46 290/40 C |
| 2011/0134574 | A1* | 6/2011 | Ritter | ............... H02P 9/007 361/21 |
| 2012/0062143 | A1* | 3/2012 | Sugawara | ............... H05B 33/0818 315/291 |

* cited by examiner

*Primary Examiner* — Tulsidas C Patel
*Assistant Examiner* — Thomas Quigley
(74) *Attorney, Agent, or Firm* — Hauptman Ham, LLP

(57) ABSTRACT

A power control system provides an output power control for a generator. The power control system includes a power conversion unit, a sensing unit, a load-dumping unit, and a control unit. The power conversion unit receives and converts a current and a voltage, generated from the generator, to supply a load. The sensing unit receives the current and the voltage to produce a current signal and a voltage signal. The load-dumping unit is connected to the generator and the power conversion unit. The control units receives the current signal and the voltage signal, produces a current control signal to control the power conversion unit, and generates a voltage control signal to control the load-dumping so as to control the output power of the generator.

14 Claims, 6 Drawing Sheets

POWER CONTROL SYSTEM AND METHOD OF CONTROLLING THE SAME

BACKGROUND

1. Technical Field

The present invention relates generally to a power control system and method; and more particularly to a power control system for providing the output power control of a generator by shifting power curves of the generator.

2. Description of Related Art

The common solutions for the problem that the wind power generation system is operated at the over-rated wind speed condition can be divided into the variable pitch control, yaw control, load-dumping control, torque increasing control, and direct short-circuit control. The variable pitch control is used to indirectly capture wind energy by controlling the windward angle of the blade. Also, the variable pitch control is usually realized for the middle-scale and large-scale wind power generation system because of high costs, high damage rate, and complicated control of the blade mechanism. The yaw control is used for reduction of capturing wind energy by tail deviation. However, the joints of the tail are easily damaged when the tail swings for months and years. The load-dumping control is that a load is used at the output side of the generator to consume superfluous energy. Because a third-order relationship is between the output power of the generator and the wind speed, a large number of loads are needed once the generator is operated at the over-rated wind speed. The torque increasing control is used to short unnecessary coils except the loading coil inside the generator so that the torque is increased to resist the blade so as to reduce the rotation speed and the output power. The direct short-circuit control is used to directly short the generator to stop operating at the rated wind speed. However, unstable wind conditions probably make the generator fail in loading due to instantaneous gusty wind, thus affecting overall power generation.

FIG. 1 is a circuit diagram of a load-dumping system of a conventional wind turbine. The load-dumping resistors 34 are used to consume electricity power generated from the generator. In particular, resistances of the load-dumping resistors 34 are substantially equal to loadings applied from an electric grid 26 to the generator. The load-dumping resistor 34 shown in FIG. 1 is the rated resistance of each phase of the three-phase power source of a permanent magnet generator (PMG) 36. In addition, the permanent magnet generator 36 is driven by a wind turbine.

A programmable logic circuit (PLC) 42 is a controller of the wind turbine to monitor the connection between the electric grid 26 and the permanent magnet generator 36, and detect losses of the load at a side of the electric grid 26. When the losses of the load are detected, a thyristor bridge circuit 44 is turned on by the programmable logic circuit 42 so as to connect the load-dumping resistors 34 to each phase of the output power of the permanent magnet generator 36, respectively. Accordingly, the load-dumping resistors 34 are used to consume electricity power generated from the generator until the load and the converter are re-connected to reduce blade speed of the wind turbine.

SUMMARY

An object of the present invention is to provide a power control system for providing the output control for a generator. Multiple power curves are set and shifted, and a small amount of load-dumping resistors are used to implement a load-dumping protection for the generator, provide more accurate and higher resolution of power controls, and further keep the maximum power output from the generator at wide-range wind speed operations.

The power control system provides an output power control for the generator driven by an external force. The power control system includes a power conversion unit, a sensing unit, a load-dumping unit, and a control unit. The power conversion unit receives a current and a voltage, generated from the generator, and converts the current and the voltage to supply a load. The sensing unit receives the current and the voltage to produce a current signal and a voltage signal. The load-dumping unit is connected to the generator and the power conversion unit. The control unit receives the current signal and the voltage signal, produces a current control signal to control the power conversion unit, and produces a voltage control signal to control the load-dumping unit so as to control output power of the generator.

Another object of the present invention is to provide a method of controlling a power control system for providing the output power control for a generator driven by an external force. Multiple power curves are set and shifted and a small amount of load-dumping resistors are used to implement a load-dumping protection for the generator, provide more accurate and higher resolution power controls, and further keep the maximum power output from the generator at wide-range wind speed operations. The method includes the steps of providing a power conversion unit and a load-dumping unit; providing a sensing unit for receiving a current and a voltage, generated from the generator, to produce a current signal and a voltage signal; and providing a control unit for receiving the current signal and the voltage signal, producing a current control signal to control the power conversion unit and producing a voltage control signal to control the load-dumping unit so as to control output power of the generator.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWINGS

The features of the present invention believed to be novel are set forth with particularity in the appended claims. The present invention itself, however, may be best understood by reference to the following detailed description of the present invention, which describes an exemplary embodiment of the present invention, taken in conjunction with the accompanying drawings, in which:

DETAILED DESCRIPTION

Figure 1:
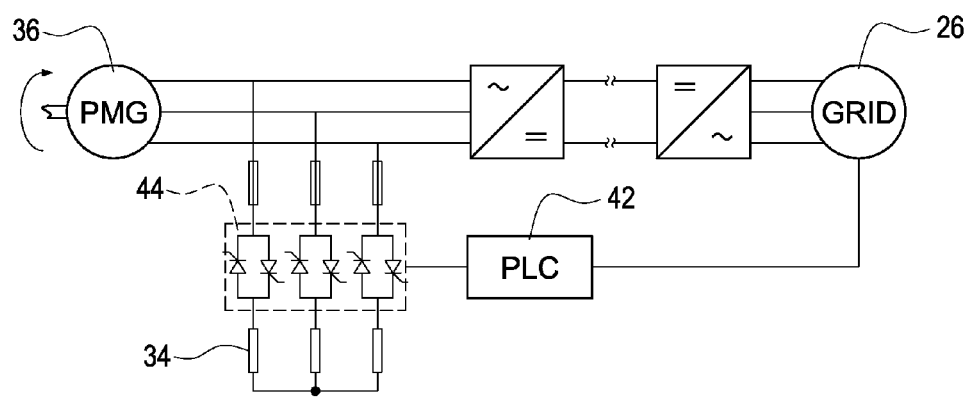
FIG. 1 is a circuit diagram of a load-dumping system of a conventional wind turbine.

Reference will now be made to the drawing figures to describe the present invention in detail.

Figure 2:
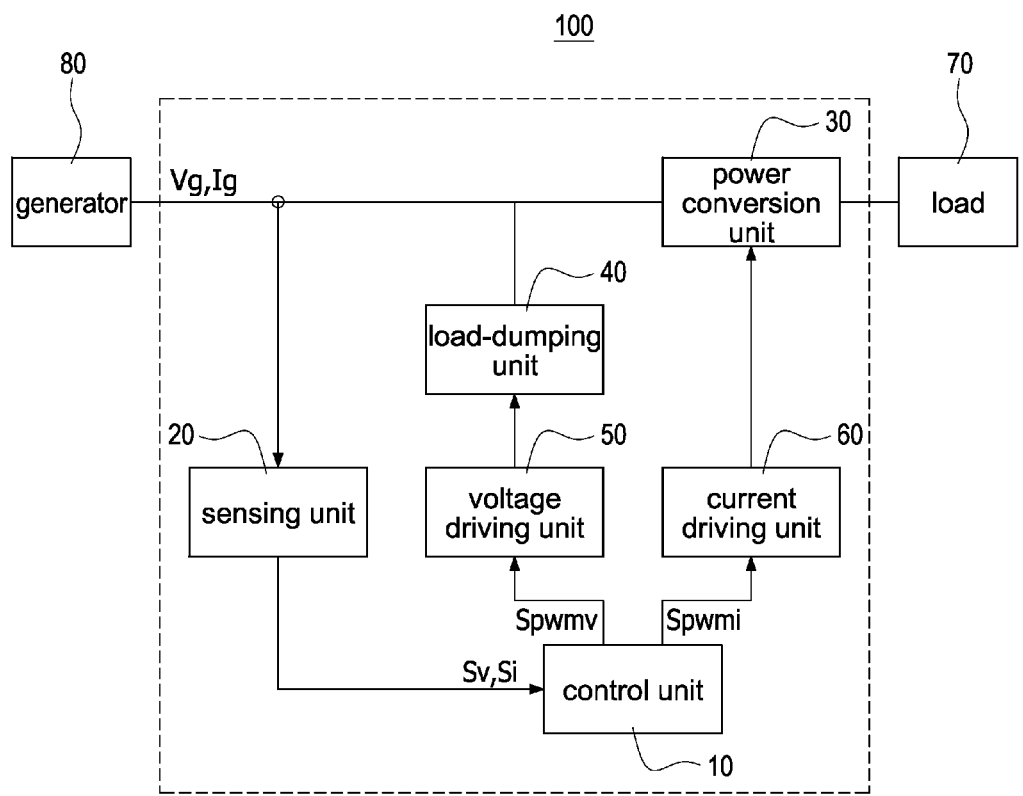
FIG. 2 is a circuit block diagram of a power control system of a generator according to the present invention.

FIG. 2 is a circuit block diagram of a power control system of a generator according to the present invention. The power control system 100 provides the power control to a generator 80 driven by an external force, such as wind power, hydraulic power, vapor power, or even human power. However, the embodiments are only exemplified but are not intended to limit the scope of the disclosure. The power control system 100 includes a power conversion unit 30, a sensing unit 20, a load-dumping unit 40, and a control unit 10. The sensing unit 20 is connected to a side of the generator 80 or between the load-dumping unit 40 and the power conversion unit 30. The load-dumping unit 40 is electrically connected to the generator 80 and the power conversion unit 30. The control unit 10 is electrically connected to the sensing unit 20 and the power conversion unit 30.

The power conversion unit 30 receives a current Ig and a voltage Vg, generated from the generator 80, and converts the current Ig and the voltage Vg to supply a load 70. The sensing unit 20 receives the current Ig and the voltage Vg to produce a current signal Si and a voltage signal Sv. The load-dumping unit 40 is connected to the generator 80 and the power conversion unit 30. The control unit 10 receives the current signal Si and the voltage signal Sv, and produces a current control signal Spwmi to control the power conversion unit 30 and produces a voltage control signal Spwmv to control the load-dumping unit 40 so as to control the output power of the generator 80. In particular, the current control signal Spwmi and the voltage control signal Spwmv are pulse width modulation (PWM) signals.

In addition, the power control system of the generator further includes a current driving unit 60 and a voltage driving unit 50. The current driving unit 60 is connected between the control unit 10 and the power conversion unit 30, and receives the current control signal Spwmi produced from the control unit 10 to drive the power conversion unit 30. The voltage driving unit 50 is connected between the control unit 10 and the load-dumping unit 40, and receives the voltage control signal Spwmv produced from the control unit 10 to drive the load-dumping unit 40. The detailed operation of the power control system of the generator will be described hereinafter as follows.

Figure 3:
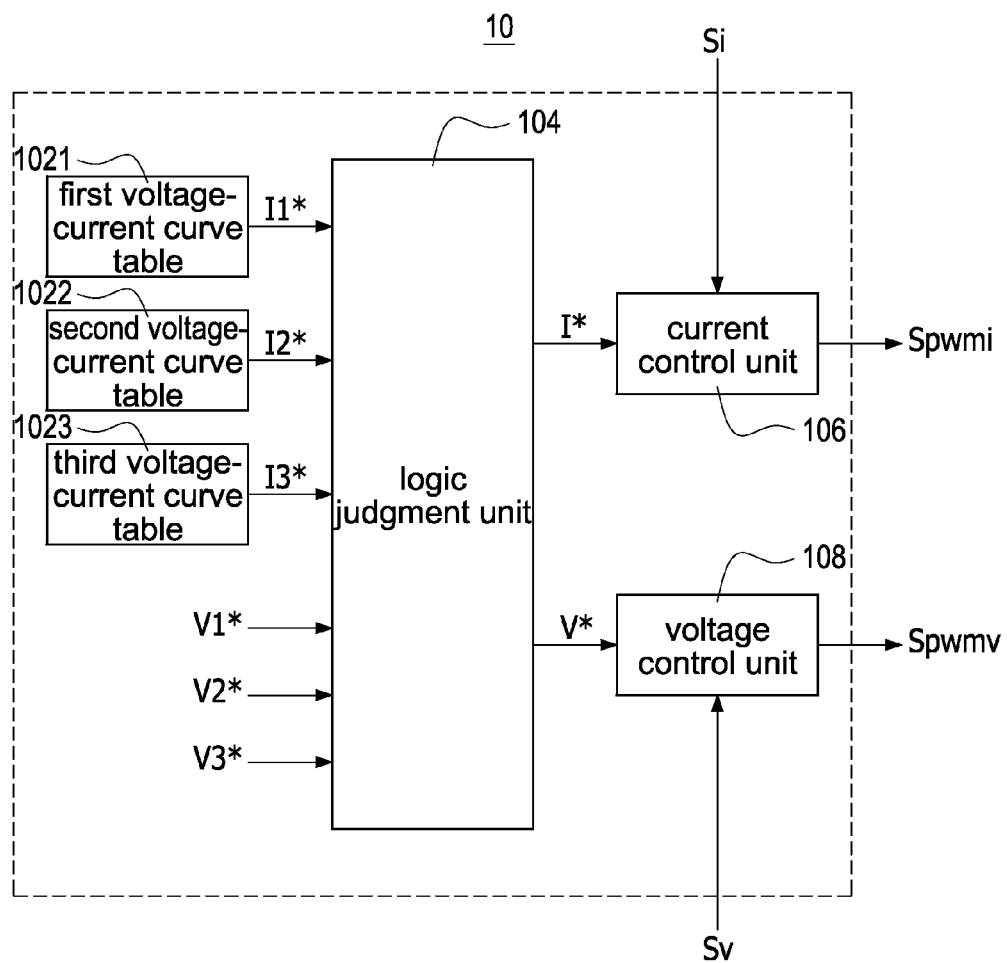
FIG. 3 is a block diagram of a control unit according to the present invention.

FIG. 3 is a block diagram of a control unit according to the present invention. The control unit 10 includes a plurality of voltage-current curve tables 1021,1022,1023, a logic judgment unit 104, a current control unit 106, and a voltage control unit 108. For convenience, three voltage-current curve tables 1021,1022,1023 are exemplified to further demonstrate the present invention. That is, the three voltage-current curve tables 1021,1022,1023 are the first voltage-current curve table 1021, the second voltage-current curve table 1022, and the third voltage-current curve table 1023, respectively. The voltage-current curve tables 1021,1022,1023 correspondingly provide current commands, that is, the first voltage-current curve table 1021 provides a first current command I1*, the second voltage-current curve table 1022 provides a second current command I2*, and the third voltage-current curve table provides a third current command I3*. Also, the current commands I1*,I2*,I3* are obtained by correspondingly inputting the voltage signal Sv to the three voltage-current curve tables 1021,1022,1023 in the lookup table manner. In addition, the first voltage command V1*, the second voltage command V2*, and the third voltage command V3* are the maximum voltage in the first voltage-current curve table 1021, the second voltage-current curve table 1022, and the third voltage-current curve table 1023, respectively. The logic judgment unit 104 receives the first current command I1*, the second current command I2*, the third current command I3*, the first voltage command V1*, the second voltage command V2*, and the third voltage command V3*, and selects one of the current commands I1*,I2*,I3* to be a current output command I* and selects one of the voltage commands V1*,V2*,V3* to be a voltage output command V*. More specifically, the current commands I1*,I2*,I3* and the voltage commands V1*,V2*,V3* are selected by the logic judgment unit 104 of the control unit 10 according to external wind conditions.

The current control unit 106 receives the current output command I* and the current signal Si to control the current signal Si following the current output command I*, that is, the current generated from the generator 80 is controlled to follow the current output command I* so as to output the current control signal Spwmi for controlling the power conversion unit 30. In addition, the voltage control unit 108 receives the voltage output command V* and the voltage signal Sv to control the voltage signal Sv following the voltage output command V*, that is, the voltage generated from the generator 80 is controlled to follow the voltage output command V* so as to output the voltage control signal Spwmv for controlling the load-dumping unit 40. More specifically, the voltage control unit 108 outputs the voltage control signal Spwmv to control the load-dumping unit 40 when the voltage signal Sv received by the control unit 10 is greater than the voltage output command V* so that the generator outputs the rated output power at different wind speed conditions.

Figure 4:
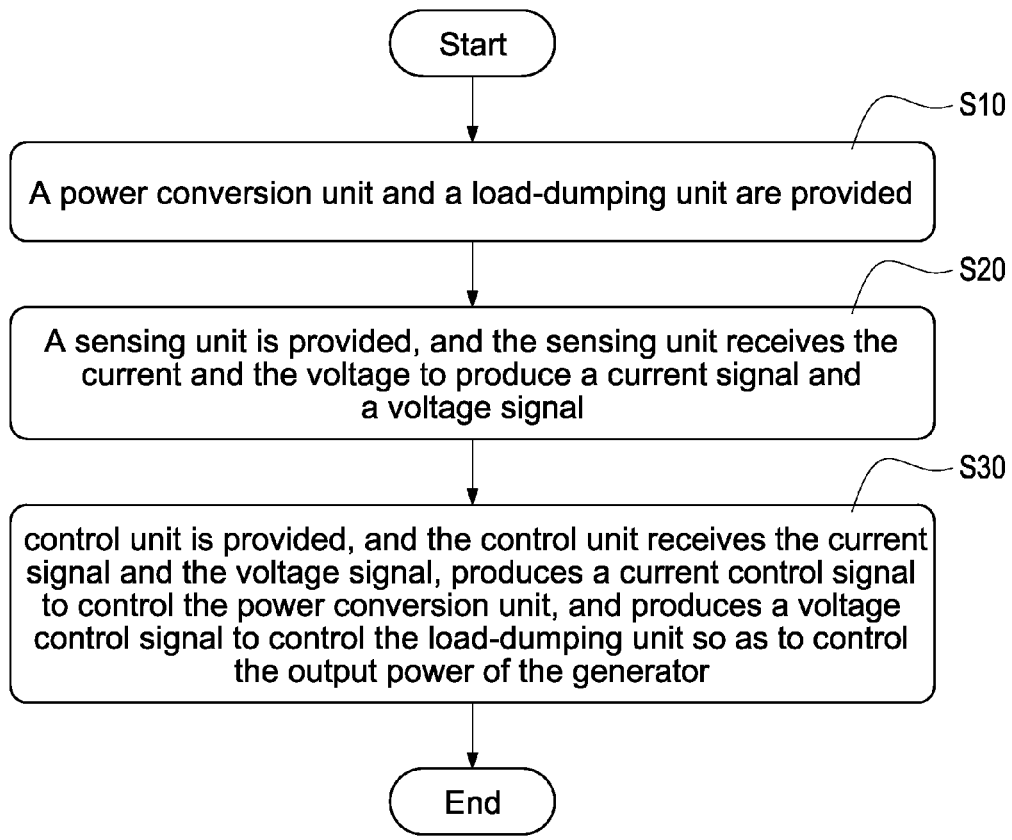
FIG. 4 is a flowchart of a method of controlling the power control system of the generator according to the present invention.

FIG. 4 is a flowchart of a method of controlling the power control system of the generator according to the present invention. The method provides the power control to a generator driven by an external force. The method includes the following steps. First, a power conversion unit and a load-dumping unit are provided (S10). The power conversion unit receives a current and a voltage generated from the generator, and converts the current and the voltage to supply a load. In particular, the load-dumping unit is connected to the generator and the power conversion unit. Afterward, a sensing unit is provided, and the sensing unit receives the current and the voltage to produce a current signal and a voltage signal (S20). Finally, a control unit is provided. The control unit receives the current signal and the voltage signal, produces a current control signal to control the power conversion unit, and produces a voltage control signal to control the load-dumping unit so as to control the output power of the generator (S30). In particular, the current control signal and the voltage control signal are pulse width modulation (PWM) signals.

In addition, the method further includes the steps of providing a current driving unit and a voltage driving unit. The current driving unit is connected between the control unit and the power conversion unit, and receives the current control signal produced from the control unit to drive the power conversion unit. The voltage driving unit is connected between the control unit and the load-dumping unit, and receives the voltage control signal produced from the control unit so as to drive the load-dumping unit.

As mentioned above, the control unit includes a plurality of voltage-current curve tables, a logic judgment unit, a current control unit, and a voltage control unit. The logic judgment unit receives the current commands and the voltage commands, selects one of the current commands to be a current output command, and selects one of the voltage commands to be a voltage output command.

The current control unit receives the current output command and the current signal to output the current control signal so as to control the current signal following the current output command, that is, the current generated from the generator is controlled to follow the current output command so as to output the current control signal for controlling the power conversion unit. In addition, the voltage control unit receives the voltage output command and the voltage signal to output the voltage control signal so as to control the voltage signal following the voltage output command, that is, the voltage generated from the generator is controlled to follow the voltage output command so as to output the voltage control signal for controlling the load-dumping unit. More specifically, the voltage control unit outputs the voltage control signal to control the load-dumping unit when the voltage signal received by the control unit is greater than the voltage output command so that the generator outputs the rated output power at different wind speed conditions.

Figure 5:
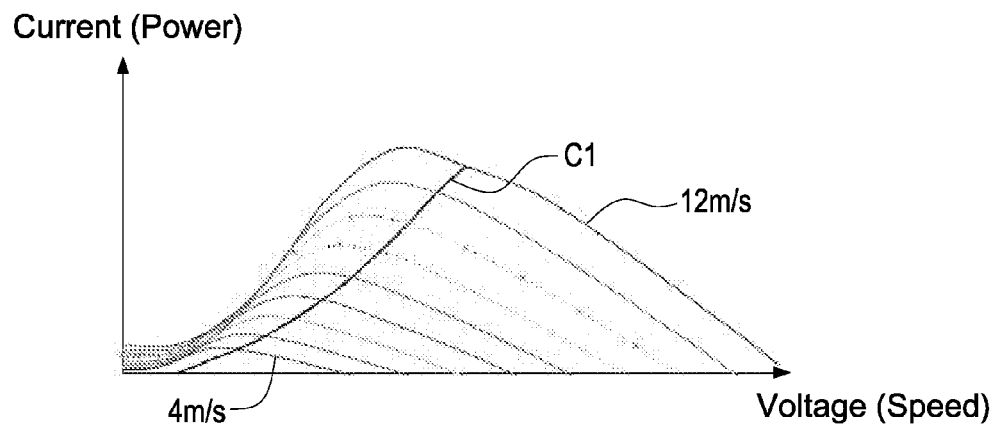
FIG. 5 shows a first power curve of the generator operating at low wind speed within the rated rotation speed according to the present invention.

FIG. 5 shows a first power curve of the generator operating at low wind speed within the rated rotation speed according to the present invention. In particular, the generator 80 is a permanent magnet generator (PMG) or a three-phase stator winding. The generator 80 is driven by an external force, such as wind power, hydraulic power, vapor power, or even human power. However, the embodiments are only exemplified but are not intended to limit the scope of the disclosure. FIG. 5 illustrates a plurality of curves, each of which indicates one voltage-current curve (also referred to as a speed-power curve) of a generator operating at different low-speed conditions within the rated rotation speed. In particular, the curves represent from 4 m/s to 12 m/s wind speed from bottom to top of the curves. In addition, each curve has a maximum power point, and the maximum power points are connected to form a maximum power curve labeled with C1 in FIG. 5. Especially, the maximum power curve C1 is a reference curve for the normally loading of the generator, thus keeping the maximum power output from the generator.

Figure 6:
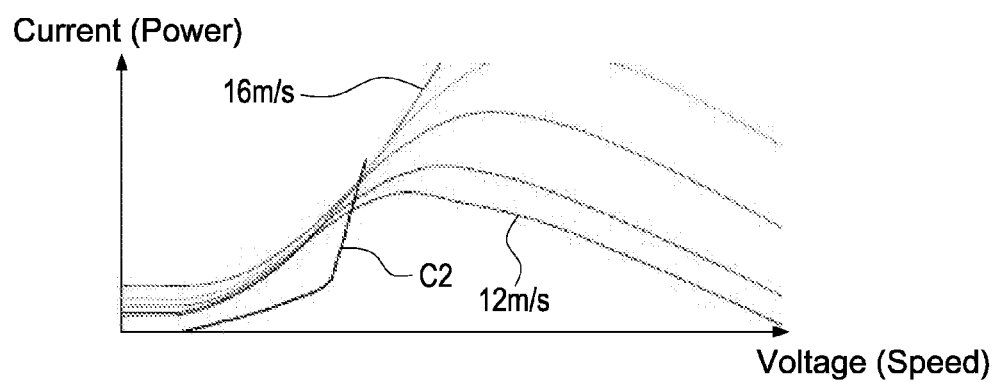
FIG. 6 shows a second power curve of the generator operating at the high and rated wind speed according to the present invention.

FIG. 6 shows a second power curve of the generator operating at the high and rated wind speed according to the present invention. FIG. 6 illustrates a plurality of curves, each of which indicates one voltage-current curve (also referred to as a speed-power curve) of a generator operating at different high speed within the rated rotation speed. In particular, the curves represent from 12 m/s to 16 m/s wind speed from bottom to top of the curves. Especially, the reference curve for the normally loading of the generator is leftward shifted from the maximum power curve C1 (as shown in FIG. 5) to a heavy-load curve C2.

Figure 7:
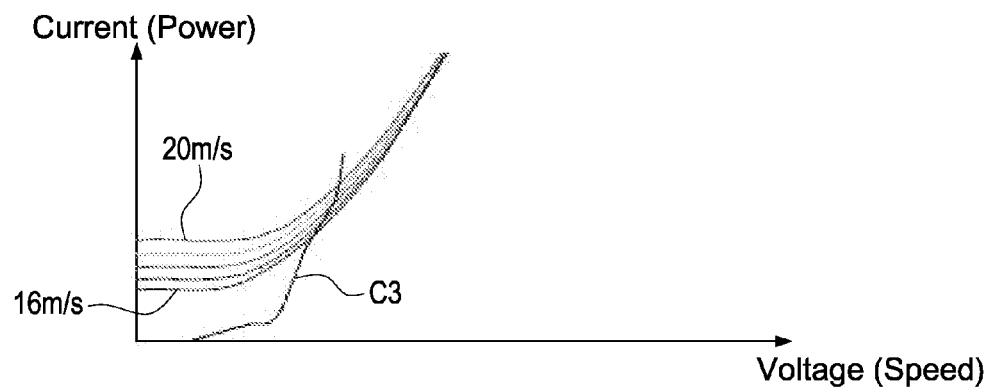
FIG. 7 shows a third power curve of the generator operating at high wind speed beyond the rated rotation speed according to the present invention.

FIG. 7 shows a third power curve of the generator operating at high wind speed beyond the rated rotation speed according to the present invention. FIG. 7 illustrates a plurality of curves, each of which indicates one voltage-current curve (also referred to as a speed-power curve) of a generator operating at different high speed beyond the rated rotation speed. In particular, the curves represent from 16 m/s to 20 m/s wind speed from bottom to top of the curves. Especially, the reference curve for the normally loading of the generator is further leftward shifted from the heavy-load curve C2 (as shown in FIG. 6) to another heavy-load curve C3.

Figure 8:
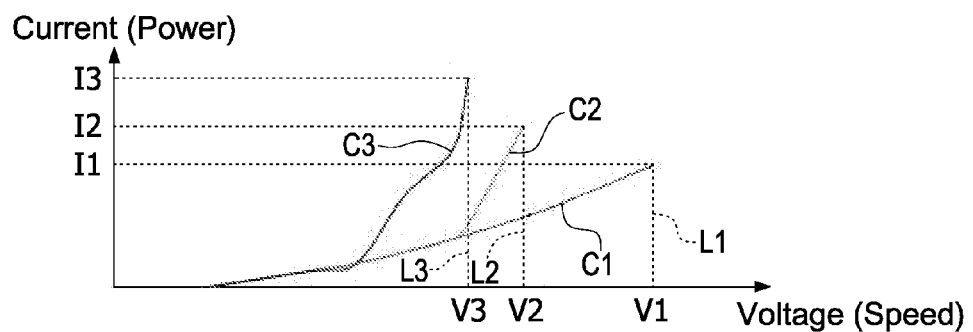
FIG. 8 shows the comparison between the power curves of the generator operating at different wind speeds according to the present invention.

FIG. 8 shows the comparison between the power curves of the generator operating at different wind speeds according to the present invention. FIG. 8 illustrates only the maximum power curve C1 as shown in FIG. 5, the heavy-load curve C2 as shown in FIG. 6, and the heavy-load curve C3 as shown in FIG. 7. Although the three power curves are exemplified to further demonstrate the present invention, unlimited power curves of the generator operating at different wind speeds can be provided according to actual applications so as to implement more accurate and higher resolution power controls. Likewise, the power curve is more leftward shifted when the generator is operated at higher wind speeds. More specifically, the load-dumping apparatus is used to adjust the current to reduce the rotation speed of the generator when the wind speed is increased to reach to the rated rotation speed and even over the rated rotation speed of the generator. Accordingly, the generator can keep outputting the rated output power at different wind speeds to avoid the damage of the generator from the over-high wind speed.

As shown in FIG. 8, three load-dumping protection lines are illustrated, and each load-dumping protection line corresponds to a power curve. For convenience, the load-dumping protection lines are respectively defined as a first load-dumping protection line, a second load-dumping protection line, and a third load-dumping protection line corresponding to a first power curve C1, a second power curve C2, and a third power curve C3. When the generator is operated at the first power curve C1 and the first load-dumping protection line L1, the maximum loading current is a first current I1. Similarly, the maximum loading current is a second current I2 when the generator is operated at the second power curve C2 and the second load-dumping protection line L2. Also, the maximum loading current is a third current I3 when the generator is operated at the third power curve C3 and the third load-dumping protection line L3. Especially, the load-dumping protection lines are implemented in the fixed voltage manner, and the fixed voltages are set to the maximum voltage of the corresponding power curves. That is, the first power curve C1 corresponds to a first voltage V1 which is the maximum voltage of the first load-dumping protection line L1; the second power curve C2 corresponds to a second voltage V2 which is the maximum voltage of the second load-dumping protection line L2; and the third power curve C3 corresponds to a third voltage V3 which is the maximum voltage of the third load-dumping protection line L3. In other words, a voltage control manner is provided when the generator is operated at abnormal wind speed. That is, the load-dumping apparatus is driven to reduce the rotation speed of the generator when the maximum voltage of the corresponding load-dumping protection line is achieved, thus keeping the maximum power output from the generator operated at different wind speeds. More specifically, as shown in FIG. 8, the first voltage command V1* corresponds to the first voltage V1 of the first load-dumping protection line L1; the second voltage command V2* corresponds to the second voltage V2 of the second load-dumping protection line L2; and the third voltage command V3* corresponds to the third voltage V3 of the third load-dumping protection line L3.

It is assumed that the rated wind speed is 12 m/s and FIG. 5 represents the normal loading of the generator. In other words, the generator normally loads according to the first power curve C1, namely the maximum power curve at different wind speed conditions, thus keeping the maximum power output from the generator. Likewise, the maximum power curve is gradually rightward shifted along with the increased wind speed. However, the maximum power curve is not referred to the loading operation of the generator once the wind speed is greater than the rated wind speed (12 m/s), and the protection of over wind speed is needed as shown in FIG. 6 and FIG. 7. The power curve is leftward shifted so that the second power curve C2 or the third power curve C3 is the reference curve for the over-speed loading of the generator to limit the maximum loading voltage of the generator. Accordingly, the generator can implement the normal loading by shifting power curves even though the wind speed is beyond the rated rotation speed.

In conclusion, the present invention has following advantages:

1. The power curve shift is used to provide the load-dumping protection for the generator without increasing additional costs when the generator is operated beyond the rated wind speed;

2. Unlimited power curves of the generator operating at different wind speeds can be provided according to actual applications so as to implement more accurate and higher resolution power controls; and 3. The load-dumping protection of the generator is implemented by using a small amount of load-dumping resistors to limit the rotation speed and the output power of the generator, and further keep the maximum power output from the generator at wide-range wind speed operations.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A power control system for providing an output power control for a generator configured to be driven by an external force, the power control system comprising:
   a power conversion unit configured to supply a load based on a current and a voltage generated by the generator;
   a sensing unit configured to produce a current signal and a voltage signal based on the current and the voltage generated by the generator;
   a load-dumping unit connected to the generator and the power conversion unit; and
   a control unit configured to produce a current control signal to control the power conversion unit, and to produce a voltage control signal to control the load-dumping unit so as to control the output power of the generator,
   wherein
      the control unit is configured to produce the current control signal and the voltage control signal based on the current signal produced by the sensing unit and the voltage signal produced by the sensing unit,
      the control unit comprises at least two voltage-current curve tables based upon which the control unit is configured to provide at least two corresponding voltage commands and at least two corresponding current commands,
      the control unit is configured to provide at least two load-dumping protection lines indicative of a corresponding maximum voltage, and
      the maximum voltage indicated by each load-dumping protection line is based on a corresponding voltage command of the at least two corresponding voltage commands.

2. The power control system of the generator in claim 1, further comprising:
   a current driving unit connected between the control unit and the power conversion unit, the current driving unit being configured to drive the power conversion unit based on the current control signal produced by the control unit; and
   a voltage driving unit connected between the control unit and the load-dumping unit, the voltage driving unit being configured to drive the load-dumping unit based on the voltage control signal produced by the control unit.

3. The power control system of the generator in claim 1, wherein the control unit comprises:
   a logic judgment unit configured to select one of the at least two corresponding current commands to be a current output command, and to select one of the at least two corresponding voltage commands to be a voltage output command;
   a current control unit configured to output the current control signal based on the current output command and the current signal; and
   a voltage control unit configured to output the voltage control based on the voltage output command and the voltage signal.

4. The power control system of the generator in claim 1, wherein the maximum voltages of the indicated by the load-dumping protection lines are fixed.

5. The power control system of the generator in claim 4, wherein
   the control unit is configured to shift from one power curve associated with the at least two voltage-current curve tables to a different power curve associated with the at least two voltage-current curve tables, and to shift from one load-dumping protection line of the at least two load-dumping protection lines to a different load-dumping protection line of the at least two load-dumping protection lines based on a wind speed to provide an over-load operation for the generator, and
   the external force by which the generator is driven is at least partially based on the wind speed.

6. The power control system of the generator in claim 1, wherein the current control signal and the voltage control signal are pulse width modulation (PWM) signals.

7. The power control system of the generator in claim 1, wherein the generator is driven by wind power, hydraulic power, vapor power, or human power.

8. The power control system of the generator in claim 1, wherein
   the sensing unit is connected to a side of the generator or between the load-dumping unit and the power conversion unit, and
   the control unit is connected to the sensing unit and the power conversion unit.

9. A method of controlling a power control system to provide an output power control for a generator driven by an external force, the method comprising:
   supplying a load, the load being supplied by a power conversion unit based on a current and a voltage generated by the generator;

producing a current signal and a voltage signal, the current signal and the voltage signal being produced by a sensing unit based on the current and the voltage generated by the generator;

producing a current control signal, the current control signal being produced by a control unit based, at least in part, on the current signal produced by the sensing unit;

producing a voltage control signal, the voltage control signal being produced by the control unit based, at least in part, on the voltage signal produced by the sensing unit; and controlling the output power of the generator based on one or more of the current control signal and the voltage control signal, wherein the power conversion unit is controlled based on the current control signal, a load-dumping unit is controlled based on the voltage control signal, and the current control signal and the voltage control signal are further based, at least in part, on at least two voltage-current curve tables based upon which the control unit is configured to provide at least two corresponding voltage commands and at least two corresponding current commands, and on at least two load-dumping protection lines indicative of a corresponding maximum voltage based on a corresponding voltage command of the at least two corresponding voltage commands.

10. The method in claim 9, further comprising:

driving the power conversion unit with a current driving unit configured to receive the current control signal generated by the control unit, wherein the current driving unit is connected between the control unit and the power conversion unit; and driving the load-dumping unit with a voltage driving unit configured to receive the voltage control signal generated by the control unit, wherein the voltage driving unit is connected between the control unit and the load-dumping unit.

11. The method in claim 9, wherein producing the current control signal comprises:

selecting one of the at least two corresponding current commands to be a current output command, the selecting being performed by a logic judgment unit of the control unit; and outputting the current control signal by a current control unit of the control unit based on the current output command and the current signal, and producing the voltage control signal comprises:

selecting one of the at least two corresponding voltage commands to be a voltage output command, the selecting being performed by the logic judgement unit; and outputting the voltage control signal by a voltage control unit of the control unit based on the voltage output command and the voltage signal.

12. The method in claim 9, wherein the maximum voltages of the load-dumping protection lines are fixed.

13. The method in claim 12, further comprising:

shifting from one power curve associated with the at least two voltage-current curve tables to a different power curve associated with the at least two voltage-current curve tables based on a wind speed; and shifting from one load-dumping protection line of the at least two load-dumping protection lines to a different load-dumping protection line of the at least two load-dumping protection lines based on the wind speed, wherein, the shifting from one power curve to the different power curve and the shifting from one load-dumping protection line to the different load-dumping protection line provides an over-load operation for the generator, and the external force by which the generator is driven is at least partially based on the wind speed.

14. The method in claim 9, wherein the current control signal and the voltage control signal are pulse width modulation (PWM) signals.

* * * * *